M. PECHSTEIN.
FLEXIBLE METAL PIPE.
APPLICATION FILED NOV. 13, 1913.

1,145,434.

Patented July 6, 1915.

UNITED STATES PATENT OFFICE.

MAX PECHSTEIN, OF ZWICKAU, GERMANY, ASSIGNOR TO THE FIRM OF LOUIS BLUMER, OF ZWICKAU, GERMANY.

FLEXIBLE METAL PIPE.

1,145,434.

Specification of Letters Patent.

Patented July 6, 1915.

Application filed November 13, 1913. Serial No. 800,748.

*To all whom it may concern:*

Be it known that I, MAX PECHSTEIN, a subject of the King of Saxony, and resident of Zwickau, Germany, have invented certain new and useful Improvements in Flexible Metal Pipes, of which the following is a specification.

This invention relates to improvements in flexible metal pipes, of the type in which the grooves in the interior of the metal pipe are covered by a spiral, of which the edges overlap each other in scale-like manner. The known flexible metal pipes of this kind have the drawback that the spiral cannot be tightened between its overlapping ends. The present invention overcomes this drawback by providing between the overlapping edges of the spiral a continuous tightening groove with packing material therein in such a way that the spiral can, independently of the outer pipe, be so tightened that any penetration of fluid or the like through the overlapping ends is impossible, the smooth inner surface of the metal pipe being not affected by this arrangement. The outer material of the spiral surrounding said groove, which for the purpose of providing the latter therein is bulbed toward the outside, bears without play upon corresponding grooves in the inside of the metal pipe, so that the spiral is compelled to exactly participate in the movements of the outer metal pipe.

Figure 1:
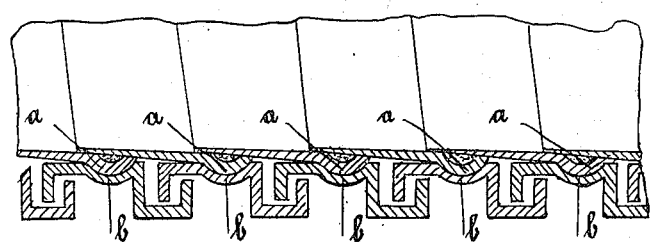
Figure 2:
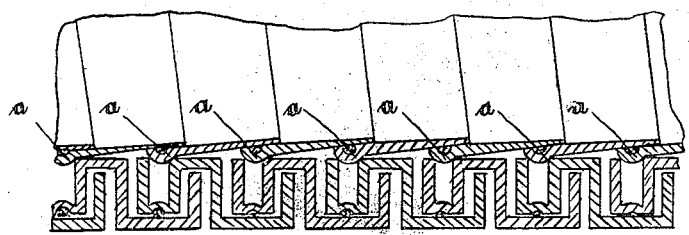
Figure 3:
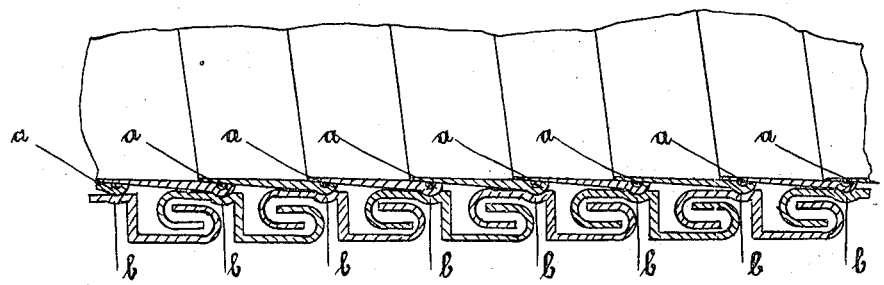

The accompanying drawing shows in Figures 1 to 3 fragmentary cross-sections of three suitable constructional forms of a metal pipe fitted with the improved spiral, *a* being the continuous groove with packing material in the spiral and *b* the corresponding bearings in the metal pipe.

What I claim, is:

A flexible metal pipe, comprising in combination, an outer metal pipe, grooved bearings on the inner surface of the same, a spiral with overlapping ends within the metal pipe having a continuous packing groove between said overlapping ends, the outer material of said groove designed to engage, without play, with said grooved bearings, substantially as and for the purpose set forth.

MAX PECHSTEIN.

Witnesses:
ELFRED J. MAGEE.
HANS MUCKE.